(12) United States Patent
Cathell et al.

(10) Patent No.: US 6,418,878 B1
(45) Date of Patent: Jul. 16, 2002

(54) SQUIRREL REPELLENT BIRD FEEDER

(76) Inventors: Phillip Walton Cathell, 11541 Old Lewiston Rd., Richmond, VA (US) 23236; John Merrill Davis, III; Jane Dornbusch Davis, both of 12418 Queensgate Rd., Midlothian, VA (US) 23113; Francis Wendell Johnson, 12000 Lucks La., Midlothian, VA (US) 23113; Louis Pitts Holt, III, 17311 Duval Rd., Moseley, VA (US) 23120; Mark Wayne Kitchen, 2411 Greenway Ave., Richmond, VA (US) 23228; Laurance Edward Dockery, 3224 Brookforest Rd., Midlothian, VA (US) 23112; Ralph W. Effinger, 12400 Sandbag Rd., Richmond, VA (US) 23113; John Merrill Davis, Jr., 10039A Palace Ct., Richmond, VA (US) 23233

( * ) Notice: Subject to any disclaimer, the term of this patent is extended or adjusted under 35 U.S.C. 154(b) by 0 days.

This patent is subject to a terminal disclaimer.

(21) Appl. No.: 09/925,219

(22) Filed: Aug. 8, 2001

Related U.S. Application Data

(63) Continuation-in-part of application No. 09/605,332, filed on Jun. 27, 2000, now Pat. No. 6,341,576.

(51) Int. Cl.$^7$ .............................................. A01K 39/01
(52) U.S. Cl. ..................................................... 119/52.3
(58) Field of Search .............................. 119/52.2, 52.3, 119/52.4, 57.8, 57.9, 428, 429, 433, 435, 459

(56) References Cited

U.S. PATENT DOCUMENTS 5,868,101 A * 2/1999 Marshall ...................... 119/428
6,119,627 A * 9/2000 Banyas et al. ............. 119/57.9

* cited by examiner

Primary Examiner—Thomas Price

(57) ABSTRACT

A bird feeder equipped with an electrically powered spinning mechanism that is triggered by the weight of a squirrel on the feeder is described. Upon detection of a squirrel on the feeder, the spinning mechanism rotates the feeder at a rate adequate to centrifugally remove the invading squirrel while resulting in a minimum loss of feed contained in the feeder.

7 Claims, 2 Drawing Sheets

US 6,418,878 B1

SQUIRREL REPELLENT BIRD FEEDER

This application is a continuation-in-part of U.S. patent application Ser. No. 09/605,332 filed Jun. 27, 2000, now U.S. Pat. No. 6,341,567.

FIELD OF THE INVENTION

The present invention relates to wild bird feeders and more particularly to a squirrel repellent such device.

BACKGROUND OF THE INVENTION

The feeding of wild birds is a popular pastime/bobby for many urban and suburban residents. Many bird-feeding devices have been developed to allow the convenient feeding of wild birds in easily observable exterior locations. In virtually all bird feeding environments, squirrels are a constant annoyance and pest as they invade bird feeders and compete with the birds for the available feed. Many times they drive the birds away and, in some cases, destroy or severely damage the bird-feeding device. Since squirrels are excellent jumpers, most manufacturers recommend locating the bird feeder at least ten feet from structures or other objects such as trees that squirrels can climb. This is not always possible, if the bird feeder is to remain located where the birds are readily observable from the inside of the home or office.

Accordingly, in order to meet and defeat the squirrel threat, many ingenious devices have been developed. Many of these remain readily defeatable by the squirrels because of their excellent jumping capabilities. Some such devices are described in the following U.S. Pat. Nos. 5,690,056, 5,535,835, 5,676,089, and 5,664,522. While the devices described in the foregoing patents all propose solutions to the problem, they are not fully satisfactory under all circumstances and are often defeated by squirrels.

Accordingly, there remains a need for a wild bird feeding device that is capable of repelling squirrels.

OBJECT OF THE INVENTION

It is an object of the present invention to provide a bird feeder that successfully repels squirrels attempting to feed therefrom.

SUMMARY OF THE INVENTION

According to the present invention, there is provided a bird feeder equipped with an electrically powered spinning mechanism that is triggered by the weight of a squirrel on the feeder. Upon detection of a squirrel on the feeder, the spinning mechanism rotates the feeder at a rate adequate to centrifugally remove the invading squirrel while resulting in a minimum loss of feed contained in the feeder.

DETAILED DESCRIPTION

Figure 1:
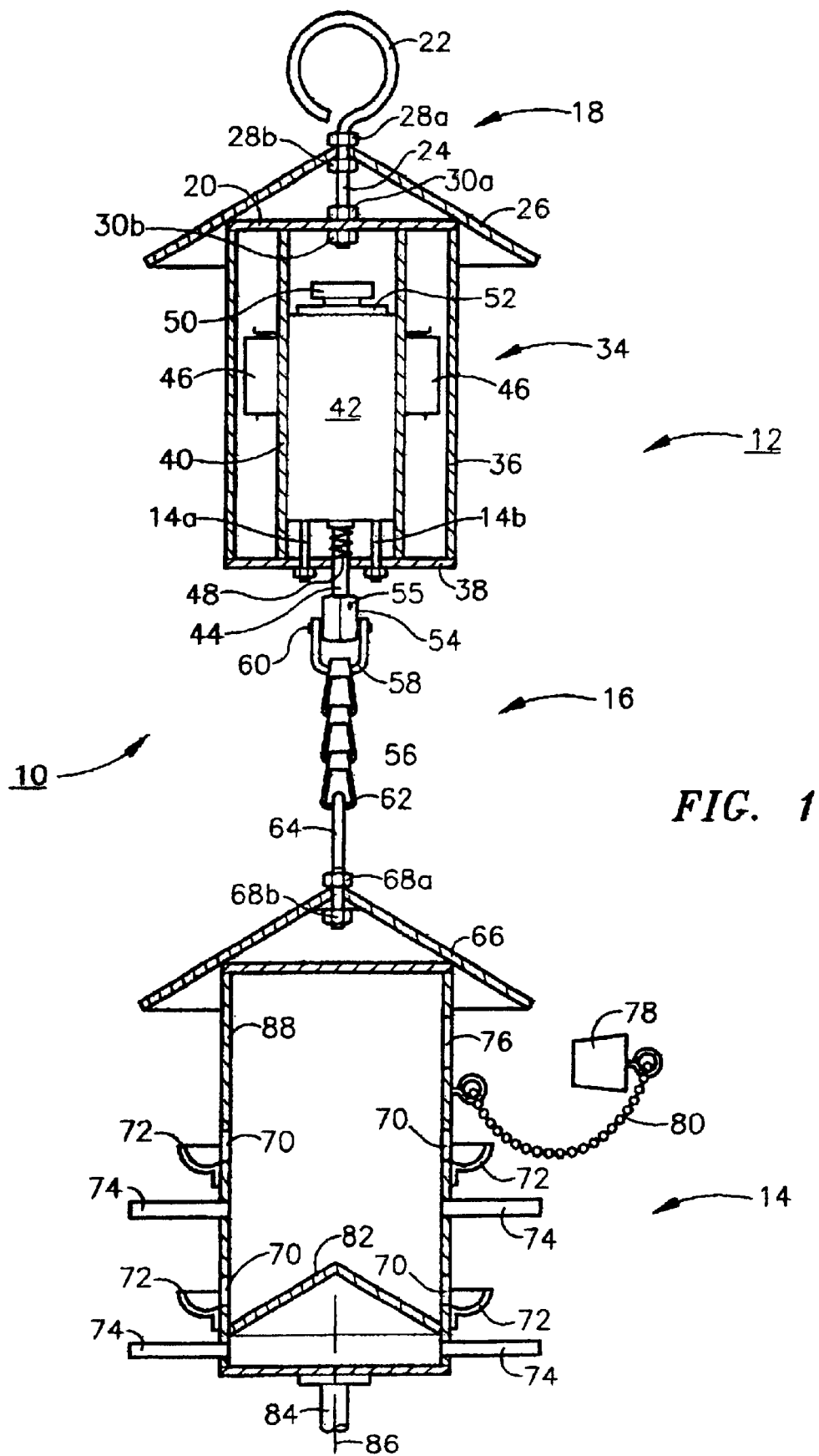
FIG. 1 is a partially cut-away side view of the squirrel repellent bird feeder of the present invention.

Referring now to FIG. 1 that depicts one preferred embodiment of the squirrel repellent bird feeder of the present invention, bird feeder 10 comprises two major members, a drive module 12 and a feeder 14 vertically connected by means of a shaft or other mechanism 16 that, as described hereinafter, is capable of transmitting rotary motion from drive module 12 to feeder 14. Drive module 12 comprises an attachment mechanism 18 for application to an overhead support such as a tree branch or other supporting structure. In the embodiment depicted in FIG. 1 attachment mechanism 18 comprises a threaded hook having a hook portion 22 for attachment to an overhead structure, tree branch or the like and a threaded shaft portion 24 securely, i.e. non-rotatably, attached directly or indirectly to top 20 and roof 26 of drive module 12. As shown in FIG. 1, such secure attachment may be provided by the tight application of nuts 28a and 28b to threaded shaft portion 24 on the upperside and underside of roof 26 respectively as well as nuts 30a and 30b on threaded shaft portion 24 on the inside and outside of top 20.

Drive module 12 comprises a housing 34 that includes top 20, cylindrical body 36 and bottom 38. Concentrically located within housing 34 is cylindrical support tube 40. Slideably located within support tube 40 is motor 42 that is allowed to travel vertically within support tube 40. Extending from the bottom of motor 42 and through bottom 38 is drive shaft 44 that transmits rotary motion to feeder 14 as described hereinafter. Retaining motor 42 in non-rotary position within support tube 40 are pins 14a and 14b that are threaded into the bottom of motor 42 but have smooth shafts in the areas thereof that pass through separate holes in bottom 38 to inhibit torque induced rotary motion of the motor relative to support tube 40 and housing 34 while permitting vertical movement of motor 42 within support tube 40 and rotation of drive shaft 44. Attached to the outside of support tube 40 are power supplies 46, in the embodiment depicted in FIG. 1, power supplies 46 are battery packs that are conventionally connected to motor 42 and electronic circuit board 52. As will be clear to the skilled artisan, if an external power source is readily and locally available, battery packs 46 may be omitted entirely without affecting the successful practice of the present invention. So long as adequate power is available to activate motor 42 and cause rotation of shaft 44 as described hereinafter, the particular power source used and its location are not particularly important to the successful practice of the present invention.

Linear force spring 48 preferably encompasses drive shaft 44 as shown in FIG. 1, and bears against the inside surface of bottom 38. Alternatively, linear force spring 48 could be mounted about an independent sliding shaft and engage the bottom of motor 42 and the inside surface of bottom 38 in a location remote from shaft 44. Linear force spring 48 is connected to displacement sensor 50 that in turn is mounted to electronic circuit board 52. Displacement sensor 50 transmits to electronic circuit board 52 signals representing the vertical displacement of motor 42 within support tube 40 induced by downward pressure on linear force spring 48 by virtue of downward pressure being applied to drive shaft 44 attached to feeder 14. Upon attainment of a predetermined vertical displacement, commensurate to the weight of a squirrel, electronic circuit board 52 closes a circuit to cause motor 42 to operate and provide rotary motion to drive shaft 44. The triggering weight causing engagement of motor 42 is above that of birds feeding on all of the perches as described below, but below that of an average squirrel.

As will be apparent to the skilled artisan, the above described motor activation circuit comprising linear force spring 48, displacement sensor 50 and electronic circuit board 52 could be replaced with a somewhat less accurate but functional activation circuit comprising a simple contact switch (not shown) at the base of motor 42. In this configuration, the simple contact switch would be closed when sufficient weight is placed on feeder 14 as to compress linear force spring 48 adequately to permit electrical contact in the contact switch and activation of motor 42. The disadvantage of such a method is that it must be periodically, (perhaps daily) adjusted to account for the declining weight of the feed as it is consumed.

A wide variety of mechanisms may be utilized to connect drive module 12 via drive shaft 44 to feeder 14. As long as whatever mechanism or connector is used properly imparts the rotary motion of motor 42 to feeder 14 it is contemplated as within the scope of the present invention. In the embodiment depicted in FIG. 1, connection of feeder 14 to drive shaft 44 is accomplished through the use of a shaft coupler 54 attached to drive shaft 44 using a conventional set screw arrangement. Drive shaft 44 is preferably D-shaped and includes an indentation that permits engagement of the set screw 55 with the indentation in drive shaft 44 to provide further support for the weight of pendant feeder 14. Again, according to the embodiment depicted in FIG. 1, a flat link chain 56, selected because of its ability to transmit rotational torque, is connected to drive shaft 44 via bracket 58 that is in turn connected to shaft coupler 54 via connecting link 60. Flat chain 56 allows the feeder and any clinging squirrel to rotate about their combined center of mass. Absent flat chain 56, the drive mechanism and its support must absorb the very large radial forces resulting from the off-center rotation. Lower end 62 of flat link chain 56 is in turn connected to attachment device at the top of feeder 14, in this case threaded eyebolt 64 that is attached to feeder roof 66 by nuts 68*a* and 68*b* threaded on threaded eyebolt 64 on the inside and outside respectively of feeder roof 66.

Feeder 14 may be of any conventional design, preferably cylindrical, the only unique requirement of the present invention being that feed outlets 70 be equipped with feed collection bowls 72 that inhibit dispersion of seed through feed outlets 70 due to centrifugal force when feeder 14 is rotated by motor 42 as described hereinafter.

Any number of feed outlets 70 may be provided and each is preferably equipped with a matching perch 74. Perches 74 are preferably fabricated from metal such as steel or aluminum and penetrate opposing surfaces of wall 88 for strength, as shown in FIG. 1. A feed supply hole 76 may be provided in wall 88 of feeder 14 as well as a stopper 78 that is attached to wall 88 of feeder 14 via a tether 80 for convenience.

According to a highly preferred embodiment of the present invention, feeder 14 includes at its bottom a conical structure 82 that prevents feed placed into feeder 14 from accumulating in the bottom thereof where it could become wet and produce fungal infections that could harm feeding birds. The presence of conical structure 82 forces the contained seed and any standing water toward the periphery of feeder 14 and the lowermost of feed outlets 70.

Optionally, according to a further preferred embodiment, a dynamic stabilizing rod 84 that provides additional mass along the axis of rotation 86 of feeder 14, thereby inhibiting horizontal motion of feeder 14 during rotation, may also be provided.

In use, bird feeder 10 is attached to a tree limb or other suitable overhead structural support after being filled with bird feed or seed. Upon a squirrel clinging to feeder 14 for purposes of obtaining feed therefrom, its weight on feeder 14 causes incremental compression of linear force spring 48 in direct proportion to its weight resulting in activation of displacement sensor 50 that provides a signal to electronic circuit board 52. Upon attainment of an appropriate change in weight, i.e. an appropriate displacement signal from displacement sensor 50, electronic circuit board 52 activates motor 42 using power from battery packs 46 thereby imparting rotary motion to drive shaft 44 and in turn feeder 14. Feeder 14 is caused to rotate at a rate, preferably about 100 revolutions per minute, adequate to cause the trespassing squirrel to be thrown off of feeder 14. This action can also provide entertainment for observing bird feeder owners as invading squirrels are rotationally removed from feeder 14. Repeated repelling of invading squirrels in this fashion will result in their losing interest in the feeder as a source of food.

Figure 2:
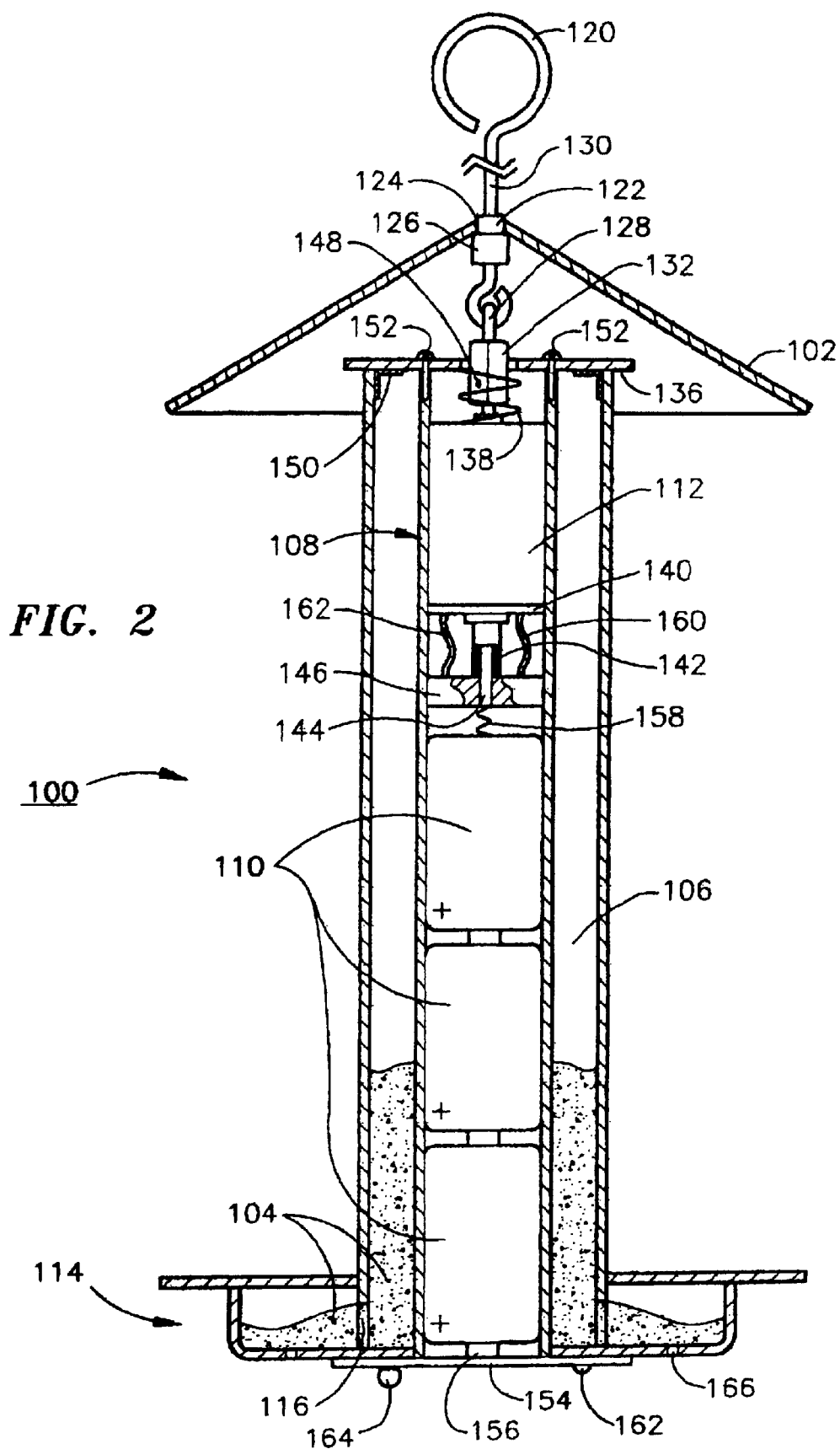
FIG. 2 is a partially cut-away side view of an alternative but equivalent embodiment of the present invention.

Referring now to FIG. 2 that depicts an alternative and yet further preferred embodiment of the device of the present invention, bird feeder 100 consists of four basic parts. A roof 102, preferably fabricated from aluminum, protects feeder 100 and bird seed 104 from the elements. Clear plastic feed tube 106 serves as the bird seed reservoir and houses drive module 108. Drive module 108 comprises a rigid tube, preferably of hard plastic, which houses batteries 110, electric motor 112 and all electronic components. Aluminum feeder tray 114 serves as the bottom of the bird seed reservoir, a bird perch, and as a feeding trough which is gravity-fed with bird seed through feed slot(s) 116 in feeder tube 106.

Feeder 100 is entirely supported in use by bent wire hook 120 extending through a hole in roof 102 sealed against the elements with rubber grommet 122. Roof 102 can slide along the shaft of hook 120. Hook 120 extends further through a hole 124 in roof-supporting spacer 126 that ends with an additional bend in its wire forming a loop for attachment to bent-wire motor hook 128. The coupling formed by hook 120 and motor hook 128 is a simple universal joint. This feature and the sliding of roof 102 along shaft 130 allow the roof to be slide up and then move sideways out of the way for bird seed 44 to be poured into the top of feed tube 106.

Bent-wire motor hook 120 is attached to drive shaft coupling 132 which freely passes through a hole 134 in rigid brace 136, preferably fabricated from aluminum or some suitable plastic, and is attached to the shaft of motor 112 which is thereby directly supported by hook 102. Coiled wire spring 138 is compressed between brace 136 and motor 112 and bears the weight of everything below brace 136 except motor 112 and electronic pcb 140 and coil 142 attached to motor 112. Motor 112 can slide vertically in drive module 108 to allow variances in this weight to cause variances in compression of spring 138. Weight measurement of everything attached to brace 136 is accomplished by electronically measuring the vertical displacement of motor 112 within drive module 108. Such displacement is measured through the action of solenoidal coil 142 which slides with motor 112 and ferrite rod 144 which is attached to fixed battery compartment end 146 to form a variable inductance depending upon displacement of all items attached to brace 136. Such variation in inductance is in turn quantified by conventional circuitry on electronic printed circuit board (pcb) 140.

Electronic pcb 140 determines when weight changes indicate the presence of a squirrel and powers motor 112 to a controlled rate of rotation to spin the feeder and eject the squirrel without throwing seed from the feeder tray 114. When powered, motor 112 creates a shaft torque which causes it to spin about its shaft. Pin 148, attached to the face of the motor and sliding freely through hole 134 in brace 136, causes brace 136 and everything suspended from it to rotate with the body of motor 112 about drive shaft coupling 132. Thus, entire device 100 with the exception of roof 102 and hook 120 and its shaft portion 168 rotates upon activation of motor 112.

The weight of feed tube 106 is born by brace 136 through right-angle bracket 150. The weight of drive module 108 is born by self-threading screws 152 down through brace 136 into the circumference of preferably plastic drive module 108. The weight of feeder tray 114 is born by self-threading screws up (not shown) through it into the circumference of preferably plastic drive module 108.

Three (or any suitable number) dry cell batteries 110 reside in a compartment formed by electrically conductive aluminum battery cover 154, drive module 108 and plastic battery compartment end 156 which is attached to the wall of drive module 108. Coiled battery spring 158 forms the negative electrical contact and battery cover 154 the positive contact. Brass-strip positive lead 160 is attached to battery cover 154 and traverses the inside wall of drive module 108 to battery compartment end 146. Wire flexible conductors 162 connect the battery spring 158 and positive lead 160 to the electronic pcb 140 which is attached to sliding motor 112. As will be obvious to the skilled artisan, batteries 110 can be replaced by a power source external drive module 108, for example, appropriate wiring connecting feeder 100 to conventional house current or some other source of low (12, 24, or similar) voltage.

Battery cover 154 is a round disk of aluminum which rotates around its attachment to feeder tray 114, battery cover rivet 162, to allow access to batteries 110. Latch 164 is a simple L-bracket of aluminum attached to feeder tray 114 under which battery cover 154 can slide to secure it.

Small drain holes 166 in the bottom of feeder tray 114 allow any entrapped water to exit feeder tube 106 and feeder tray 114 instead of accumulating in feeder tray 114.

As the invention as been described, it will be apparent to those skilled in the art that the same may be varied in many ways without departing from the spirit and scope of the invention. Any and all such modifications are intended to be included within the scope of the appended claims.

What is claimed is:

1. A squirrel repellent bird feeder comprising:
   A) a roof having a hole through the approximate center thereof;
   B) a non-rotating attachment mechanism including a shaft through said hole;
   C) a drive module concentric with and attached to said shaft via a mechanism that permits rotation of said drive module about said shaft and including a spring that is compressed upon the application of weight to said drive module, a motor, a weight sensing device and a power supply for powering said motor and said weight sensing device; and
   D) a feeder portion comprising;
      1) a seed reservoir having a top and a bottom portion concentric with said shaft about the periphery of said drive module and attached to said drive module and rotatable therewith; and
      2) a feeder tray located at said bottom portion; said weight sensing device being capable of activating said motor upon the application of the weight of a squirrel causing rotation of said drive module, said feeder portion and said feeder tray at a controlled rate.

2. The squirrel repellent bird feeder of claim 1 wherein said non-rotating attachment mechanism is a shaft coupling.

3. The squirrel repellent bird feeder of claim 1 wherein said weight sensing device comprises:
   A) a ferrite rod;
   B) a coil about said ferrite rod that changes inductance as said coil moves longitudinally along the length of said ferrite rod as said spring is compressed; and
   C) a printed circuit board that receives inductance change signals from said coil as said spring is compressed, and supplies motor activation energy to said motor from said power supply upon the attainment of a predetermined inductance related to a weight applied to said spring.

4. The squirrel repellent bird feeder of claim 1 wherein said power supply comprises batteries housed in said drive module.

5. The squirrel repellent bird feeder of claim 1 wherein bird feed contained in said feed reservoir is supplied to said feeder tray by slots in the bottom portion of said feed reservoir.

6. The squirrel repellent bird feeder of claim 1 wherein said drive module and said feeder portion are generally circular.

7. The squirrel repellent bird feeder of claim 1 further including drain holes in said feeder tray.

* * * * *